(12) United States Patent
Lee et al.

(10) Patent No.: US 8,451,738 B2
(45) Date of Patent: May 28, 2013

(54) SIGNAL TRANSMITTING APPARATUS AND SIGNAL TRANSMITTING METHOD

(75) Inventors: Seok-Jin Lee, Daejeon (KR); Ki Seok Kim, Gyeongju-si (KR); Young-Il Kim, Daejeon (KR)

(73) Assignees: Samsung Electronics Co., Ltd., Suwon-Si (KR); Electronics ad Telecommunications Research Institute, Daejeon (KR)

( * ) Notice: Subject to any disclaimer, the term of this patent is extended or adjusted under 35 U.S.C. 154(b) by 330 days.

(21) Appl. No.: 12/735,075

(22) PCT Filed: Jul. 11, 2008

(86) PCT No.: PCT/KR2008/004096
§ 371 (c)(1),
(2), (4) Date: Jun. 14, 2010

(87) PCT Pub. No.: WO2009/078527
PCT Pub. Date: Jun. 25, 2009

(65) Prior Publication Data
US 2010/0254270 A1 Oct. 7, 2010

(30) Foreign Application Priority Data
Dec. 14, 2007 (KR) ........................ 10-2007-0131496

(51) Int. Cl.
*H04L 12/26* (2006.01)
(52) U.S. Cl.
USPC ...................................................... 370/241
(58) Field of Classification Search
USPC ......... 370/241, 248, 250–252, 351, 428–429; 711/100–101, 147, 149
See application file for complete search history.

(56) References Cited

U.S. PATENT DOCUMENTS

| 5,621,774 | A | * | 4/1997 | Ishibashi et al. | 375/371 |
| 5,933,053 | A | * | 8/1999 | Iemura | 329/311 |
| 6,370,200 | B1 | | 4/2002 | Takahashi | |
| 7,000,056 | B2 | | 2/2006 | Poisner | |
| 7,088,172 | B1 | * | 8/2006 | Lesea et al. | 327/543 |

(Continued)

FOREIGN PATENT DOCUMENTS

| JP | 2004-120678 | | 4/2004 |
| JP | 2004120678 | * | 4/2004 |

(Continued)

OTHER PUBLICATIONS

International Search Report and Written Opinion of International Searching Authority dated Dec. 8, 2008 in relation to International Application No. PCT/KR2008/004096.

*Primary Examiner* — Mark Rinehart
*Assistant Examiner* — Omar Ghowrwal

(57) ABSTRACT

A signal transmitting apparatus includes: a plurality of data transmission lines that transmit output data to a memory; a plurality of delay units that are correspondingly connected to the plurality of data transmission lines, that delay test data according to a delay signal for a predetermined time, and that output the delayed test data to each of the data transmission lines; and a transmitting/receiving controller that compares the stored data in the memory with the test data to adjust the delay signal, and that outputs the adjusted delay signal to each of the plurality of delay units. With this configuration, when data is transmitted to a memory through a data bus, a delay value can be adjusted among a plurality of signal lines constituting a data bus, and thus signal transmission can be performed uniformly.

20 Claims, 2 Drawing Sheets

U.S. PATENT DOCUMENTS

| | | | |
|---|---|---|---|
| 7,289,378 B2 | 10/2007 | Ivanov | |
| 2003/0002474 A1* | 1/2003 | Alexander et al. | 370/351 |
| 2007/0222457 A1* | 9/2007 | Haynes et al. | 324/603 |

FOREIGN PATENT DOCUMENTS

| | | |
|---|---|---|
| JP | 2006-260071 | 9/2006 |
| KR | 10-2002-0032081 | 5/2002 |
| KR | 10-2003-0082685 | 10/2003 |
| KR | 10-2005-0119663 | 12/2005 |
| KR | 10-2006-0130772 | 12/2006 |

* cited by examiner

SIGNAL TRANSMITTING APPARATUS AND SIGNAL TRANSMITTING METHOD

CROSS-REFERENCE TO RELATED APPLICATION(S)

The present application is related to International Application No. PCT/KR2008/004096 filed Jul. 11, 2008 entitled "SIGNAL TRANSMITTING APPARATUS AND SIGNAL TRANSMITTING METHOD" which claims priority to Korean Patent Application No. 10-2007-0131496 filed Dec. 14, 2007. International Application No. PCT/KR2008/004096 is assigned to the assignee of the present application and is hereby incorporated by reference into the present disclosure as if fully set forth herein. The present application hereby claims priority under 35 U.S.C. §119(a) to International Patent Application No. PCT/KR2008/004096 and Korean Patent Application No. 10-2007-0131496.

TECHNICAL FIELD

The present invention relates to a signal transmitting apparatus and a signal transmitting method.

In particular, the present invention relates to a signal transmitting apparatus and a signal transmitting method that transmit data through a plurality of signal lines constituting a data bus while interfacing.

BACKGROUND ART

When data is transmitted in parallel through data transmission lines having a plurality of signal lines, signal delay is caused by parasitic resistance of each transmission line.

FIG. 1 is a waveform diagram illustrating signal delay according to a plurality of transmission lines.

Referring to FIG. 1, data transmitted according to a clock signal Clock are transmitted through respective transmission lines BUS1, BUS2, BUS3, and BUS4 with predetermined signal delays.

Such signal delays have different values depending on parasitic resistance of the respective transmission lines BUS1, BUS2, BUS3, and BUS4.

When data that are transmitted through the transmission lines BUS1, BUS2, BUS3, and BUS4 are digital signals, since the digital signals are transmitted at a higher speed than, for example, analog signals, the signal delay may cause a data error. As shown in FIG. 1, when data are exchanged in parallel, a time required for loading the data on the transmission lines BUS1, BUS2, BUS3, and BUS4 stably varies according to the transmission lines BUS1, BUS2, BUS3, and BUS4. For this reason, after the data loaded on all of the transmission lines BUS1, BUS2, BUS3, and BUS4 stabilized, logic values are determined based on a synchronizing clock.

Accordingly, when interfacing to a memory is carried out through a programmable logic device (PLD), even if the clock signal for the data transmission lines BUS1, BUS2, BUS3, and BUS4 does not conform to the memory specification, a clock signal having a plurality of cycles must be used to make data stable. This may cause a decrease in memory access speed.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a signal transmitting apparatus, having an advantage of transmitting signals uniformly through a data bus having a plurality of signal lines when a user carries out interfacing to a memory by hardware.

Technical Solution

An exemplary embodiment of the present invention provides a signal transmitting apparatus including: a plurality of data transmission lines that transmit output data to a memory; a plurality of delay units that are correspondingly connected to the plurality of data transmission lines, that delay test data according to a delay signal for a predetermined time, and that output the delayed test data to each of the data transmission lines; and a transmitting/receiving controller that compares the stored data in the memory with the test data to adjust the delay signal, and outputs the adjusted delay signal to each of the plurality of delay units.

The transmitting/receiving controller may set a delay signal as a final delay signal when a difference between the stored data and the test data has a minimum value, for the plurality of delay units, and may output the final delay signal to each of the plurality of delay units.

A delay time of each of the delay units according to the final delay signal may be smaller than the cycle of a clock signal for data transmission of the test data.

The signal transmitting apparatus may further include a plurality of selection units that receive input data from the outside and the test data from the transmitting/receiving controller, and that selectively output one of the input data and the test data to each of the delay units.

The test data to be input to the plurality of selection units may be the same.

Each of the delay unit may include a plurality of buffers, and the number of buffers through which the test data passes may be determined according to the delay signal.

Another embodiment of the present invention provides a signal transmitting method including: transmitting test data to which an initial delay value is applied to a memory through a data bus; reading data stored in the memory and comparing the stored data with the test data; changing a delay value according to the comparison result; and applying the changed delay value to the test data and transmitting the test data to the memory through the data bus.

The comparing of the stored data and the test data may determine whether or not the stored data and the test data corresponding to a plurality of data buses have the same waveform.

When a signal difference between the stored data and the test data corresponding to a plurality of data buses has a minimum value, the changed delay value may be determined as a final delay value.

The signal transmitting method may further include applying the final delay value to input data and transmitting the input data to the memory.

A delay time according to the final delay value may be smaller than the cycle of a clock signal for data transmission of the input data.

The signal transmitting method may further include selecting one of the input data from the outside and the test data according to a selection signal and outputting the selected data.

The same test data may be transmitted to the plurality of data buses.

The delaying of the test data may cause the test data to pass through buffers, the number of buffers being determined according to the delay value.

Advantageous Effects

Therefore, according to the present invention, when data is transmitted to a memory through a data bus, a delay value can be adjusted among a plurality of signal lines constituting a data bus, and thus signal transmission can be performed uniformly.

MODE FOR THE INVENTION

Figure 1:
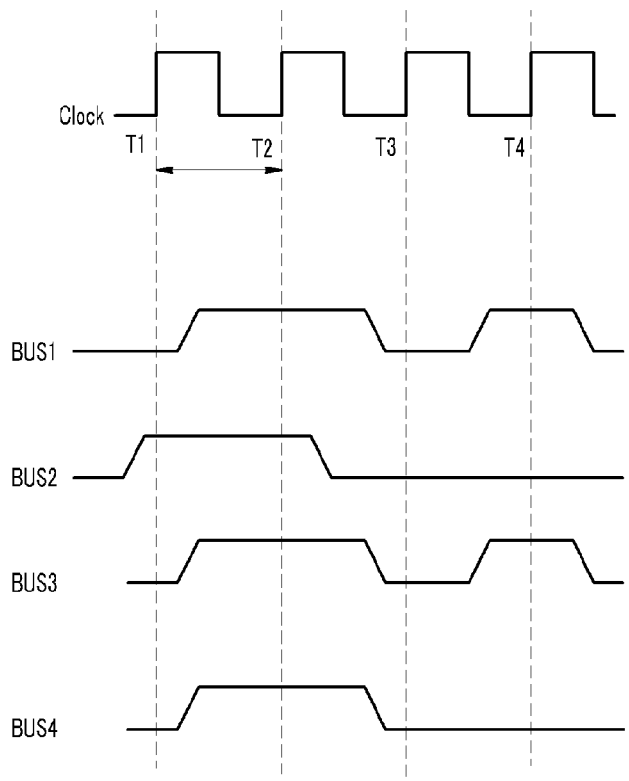
FIG. 1 is a waveform diagram illustrating signal delay according to a plurality of transmission lines.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

Throughout this specification, unless explicitly described to the contrary, the word "comprise" and variations such as "comprises" or "comprising" will be understood to imply the inclusion of stated elements but not the exclusion of any other elements. In addition, the terms "-er", "-or", "section", "unit", and "module" described in the specification mean units for processing at least one function and operation and can be implemented by hardware components or software components and combinations thereof.

Hereinafter, a signal transmitting apparatus that can transmit signals with no signal delay will be described with reference to FIGS. 2 and 3.

Figure 2:
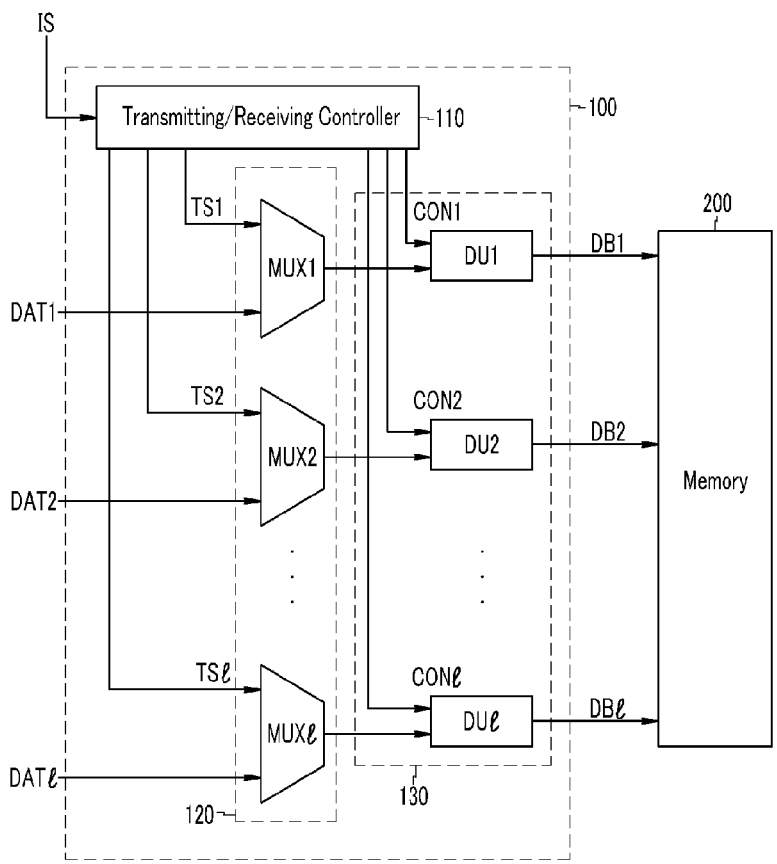
FIG. 2 is a block diagram illustrating a signal transmitting apparatus according to an exemplary embodiment of the present invention.
Figure 3:
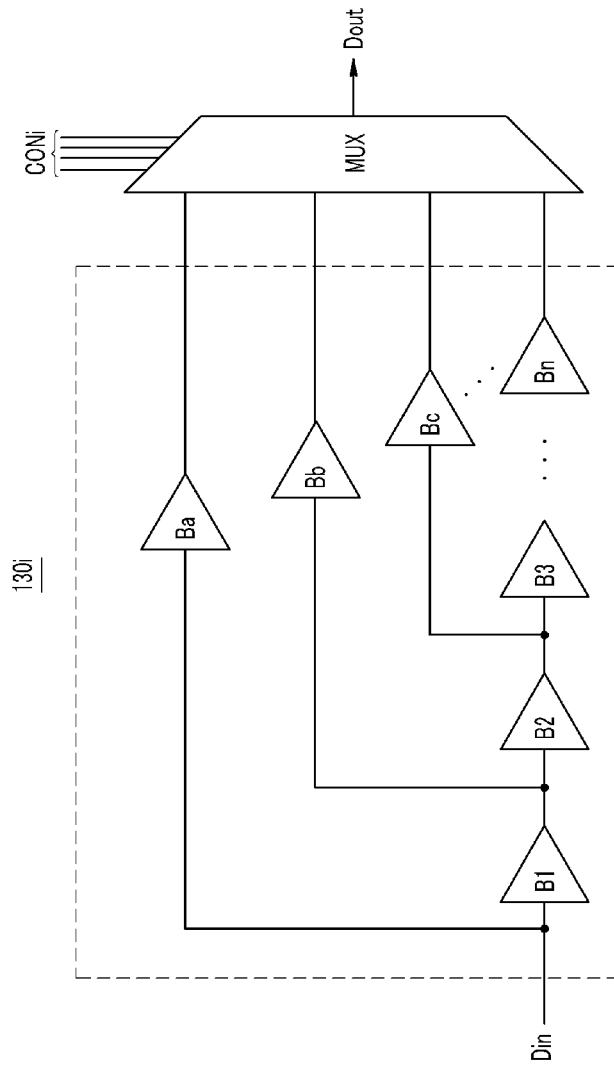
FIG. 3 is a schematic diagram illustrating an example of a delay unit shown in FIG. 2.

FIG. 2 is a block diagram illustrating a signal transmitting apparatus according to an exemplary embodiment of the present invention, and FIG. 3 is a schematic diagram illustrating an example of a delay unit shown in FIG. 2.

Referring to FIG. 2, a signal transmitting apparatus 100 according to an exemplary embodiment of the present invention includes a transmitting/receiving controller 110, a selection unit 120, and a signal delay section 130.

The transmitting/receiving controller 110 receives an initial signal IS from the outside, initializes the selection unit 120 and the signal delay section 130, and controls the selection unit 120 and the signal delay section 130.

The selection unit 120 includes a plurality of multiplexers MUX1 to MUXl. The multiplexers MUX1 to MUXl are correspondingly connected to delay units DU1 to DUl, select transmission signals DAT1 to DATl from the outside and initial test values TS1 to TSl from the transmitting/receiving controller 110, and output the selected signals to the delay units DU1 to DUl.

The signal delay section 130 includes the plurality of delay units DU1 to DUl. The delay units DU1 to DUl are connected between the multiplexers MUX1 to MUXl and data buses DB1 to DBl, respectively. The delay unit DU1 to DUl receive the output signals from the multiplexers MUX1 to MUXl connected thereto and control signals CON1 to CONl from the transmitting/receiving controller 110, and output the output signals while delaying the output signals according to the control signals CON1 to CONl for a predetermined time, respectively.

The plurality of data buses DB1 to DBl include a plurality of data line groups, and are connected to different ports of a memory 200. A delayed signal is transmitted to the memory 200 through the data bus DBi through the delay unit Dui (where i=1, 2, ..., and l).

Referring to FIG. 3, the delay unit DUi includes a plurality of buffers B1 to Bn and Ba to Bn−1, and a multiplexer MUX.

The plurality of buffers B1 to Bn and Ba to Bn−1 include buffers B1 to Bn that are connected in series, and buffers Ba to Bn−1 that receive signals on connection points between the buffers B1 to Bn and output the signals to the multiplexer MUX.

Each of the buffers B1 to Bn and Ba to Bn−1 outputs input data Din while delaying the input data for a predetermined time. The delay time is determined according to the number of buffers B1 to Bn and Ba to Bn−1 through which the input data passes.

Accordingly, a plurality of delayed signals input to the multiplexer MUX have different values. The multiplexer MUX selects one delayed signal according to the control signal CONi from the transmitting/receiving controller 110 and outputs the selected delayed signal as an output signal Dout.

Hereinafter, a method of adjusting a delay value according to an exemplary embodiment of the present invention will be described with reference to FIG. 4.

Figure 4:
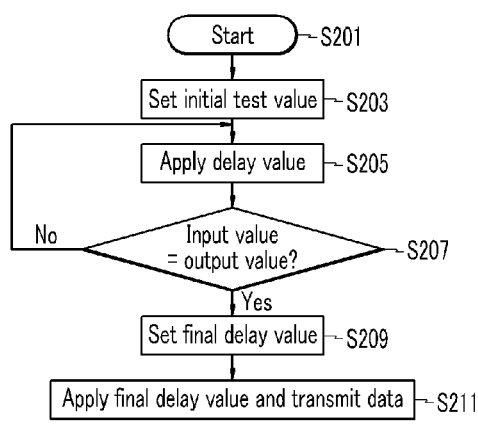
FIG. 4 is a flowchart illustrating the operation of the signal transmitting apparatus shown in FIG. 2.

FIG. 4 is a flowchart illustrating the operation of the signal transmitting apparatus shown in FIG. 2.

Referring to FIG. 4, if a signal transmission operation starts, the transmitting/receiving controller 110 receives the initial signal IS from the outside (S201).

The transmitting/receiving controller 110 sets the initial test values TS1, to TSl according to the initial signal IS, and correspondingly outputs the initial test values TS1 to TSl to the multiplexers MUX1 to MUXl (S203).

The initial test values TS1 to TSl are used when the user sets whether or not to use a timing trace mode, and inform of signal timing to be written and read with respect to the memory 200 at the beginning of interfacing. The initial set values are values before optimization, and may be the same as the initial test values TS1 to TSl for the plurality of multiplexers MUX1 to MUXl.

The transmitting/receiving controller 110 also sets initial delay values for the plurality of delay units DU1 to DUl and outputs the set initial delay values.

The plurality of multiplexers MUX1 to MUXl output the initial test values TS1 to TSl from the transmitting/receiving controller 110 to the delay units DU1 to DUl, respectively. The delay units DU1 to DUl delay the initial test values TS1 to TSl according to the initial delay values, and transmit the delayed initial test values to the memory 200 through the data buses DB1 to DBl, respectively.

Next, the transmitting/receiving controller 110 reads, from the memory 200, the initial test values TS1 to TSl stored in the memory 200, and compares the read initial test values TS1 to TSl with the initial test values TS1 to and TSl stored therein (S207).

From the comparison result of the signal waveforms of the initial test values TS1 to TSl to be input to the memory 200 and the initial test values TS1 to TSl, when it is determined that distortion according to signal delay occurs, the transmitting/receiving controller 110 outputs the control signals CON1 to CONl in which the delay values for the delay units DU1 to DUl are adjusted.

The delay units DU1 to DUl delay the initial test values TS1 to and TSl according to the adjusted delay values and output the delayed initial test values TS1 to TSl to the memory 200 through the data buses DB1 to DBl. Then, the transmitting/receiving controller 110 reads the initial test values TS1 to and TSl stored in the memory 200 and compares the read initial test values TS1 to TSl with the initial test values TS1 to TSl stored therein.

The transmitting/receiving controller 110 repeats this operation, and stores the delay value groups for the plurality of delay units DU1 to and DUl and the comparison result. Then, the transmitting/receiving controller 110 determines, among the delay value groups, an optimum delay value group when the delay time between the initial test values TS1 to TSl stored therein and the initial test values TS1 to TSl stored in the memory 200 has a minimum value (S209).

The transmitting/receiving controller 110 sets the delay values of the optimum delay value group as the final delay values and transmits the set final delay values to the delay units DU1 to DUl, respectively.

The final delay values may be set to be different according to the delay units DU1 to DUl. At this time, the operation of delay units having a large signal difference among the plurality of delay units DU1 to DUl may be restricted.

The delay values are much smaller than the cycle of a clock signal for data transmission, which is used to output data to the data buses DB1 to DBl.

Next, the plurality of delay units DU1 to DUl set the final delay values, delay the transmission signals DAT1 to DATl from the multiplexers MUX1 to MUXl for a predetermined time, and output the delayed transmission signals to the data buses DB1 to DBl (S211).

In this way, by adjusting the delay values of the individual delay units DU1 to DUl, it is possible to actively compensate the arrival time delay at the memory 200 due to the data buses DB1 to DBl.

In addition, the delay values for compensating the signal delay can be set for the delay units DU1 to DUl, while various data bit patterns can be applied according to the transmission signals DAT1 to DATl.

The embodiment of the present invention described above is not be implemented by only the method and apparatus, but it may be implemented by a program for executing the functions corresponding to the configuration of the exemplary embodiment of the present invention or a recording medium having recorded thereon the program. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A signal transmitting apparatus, comprising:
   a plurality of data transmission lines configured to transmit output data to a memory;
   a plurality of delay units that are correspondingly connected to the plurality of data transmission lines, configured to delay test data according to different delay signals for a predetermined time, and output the delayed test data to each of the data transmission lines, wherein each one of the plurality of delay units contains a particular delay value and is associated with a different one of a plurality of control signals; and
   a transmitting/receiving controller configured to compare stored data in the memory with the test data to adjust each particular delay value to a different value from each other particular delay value by making use of the plurality of control signals, and configured to output the plurality of control signals to each of the plurality of delay units.

2. The signal transmitting apparatus of claim 1, wherein the transmitting/receiving controller is configured to determine, as a final delay signal, a delay signal when a difference between the stored data and the test data has a minimum value, for the plurality of delay units, and output the final delay signal to each of the plurality of delay units.

3. The signal transmitting apparatus of claim 2, wherein a delay time of each of the delay units according to the final delay signal is smaller than a cycle of a clock signal for data transmission of the test data.

4. The signal transmitting apparatus of claim 1, further comprising:
   a plurality of selection units configured to receive input data from outside and the test data from the transmitting/receiving controller, and selectively output one of the input data and the test data to each of the delay units.

5. The signal transmitting apparatus of claim 4, wherein the test data to be input to the plurality of selection units are the same.

6. The signal transmitting apparatus of claim 1, wherein each of the delay units includes a plurality of buffers, and
   a number of buffers through which the test data passes is determined according to the plurality of control signals.

7. A signal transmitting method, comprising:
   transmitting test data, to which initial delay values are applied respectively, to a memory through a plurality of data buses such that each one of the plurality of data buses is associated with a different one of a plurality of control signals;
   reading data stored in the memory and comparing stored data with the test data;
   changing said delay values such that each of said delay values differs from each other of said delay values according to the comparing of the stored data with the test data; and
   applying the changed delay values to the test data and transmitting the test data to the memory through the data buses.

8. The signal transmitting method of claim 7, wherein the comparing of the stored data and the test data determines whether or not the stored data and the test data corresponding to a plurality of data buses have a same waveform.

9. The signal transmitting method of claim 8, wherein, when a signal difference between the stored data and the test data corresponding to a plurality of data buses has a minimum value, a changed delay value is determined as a final delay value.

10. The signal transmitting method of claim 9, further comprising applying the final delay value to input data and transmitting the input data to the memory.

11. The signal transmitting method of claim 10, wherein a delay time according to the final delay value is smaller than a cycle of a clock signal for data transmission of the input data.

12. The signal transmitting method of claim 11, further comprising selecting one of the input data from outside and the test data according to a selection signal and outputting the selected data.

13. The signal transmitting method of claim 12, wherein a same test data are transmitted to the plurality of data buses.

14. The signal transmitting method of claim 13, wherein delaying of the test data causes the test data to pass through buffers, a number of buffers being determined according to the control signals.

15. A communication device comprising:
a memory; and
a transmitter coupled to the memory, the transmitter comprising:
a plurality of data transmission lines configured to transmit output data to the memory;
a plurality of delay units coupled to the plurality of data transmission lines, configured to delay test data according to a delay signal for a predetermined time, and output the delayed test data to each of the data transmission lines, wherein each one of the plurality of delay units contains a particular delay value and is associated with a different one of a plurality of control signals; and
a controller configured to:
receive an initial signal from an external source,
compare stored data in the memory with the test data to adjust each particular delay value to a different value from each other particular delay value by making use of the plurality of control signals, and
output the plurality of control signals, to each of the plurality of delay units.

16. The communication device of claim 15, wherein the controller is configured to determine, as a final delay signal, a delay signal when a difference between the stored data and the test data has a minimum value, for the plurality of delay units, and output the final delay signal to each of the plurality of delay units.

17. The communication device of claim 15, wherein a delay time of each of the delay units according to a final delay signal is smaller than a cycle of a clock signal for data transmission of the test data.

18. The communication device of claim 15, further comprising:
a plurality of selection units configured to receive input data from outside and the test data from the controller, and selectively output one of the input data and the test data to each of the delay units.

19. The communication device of claim 18, wherein the test data to be input to the plurality of selection units are the same.

20. The communication device of claim 15, wherein
each of the delay units includes a plurality of buffers, and
a number of buffers through which the test data passes is determined according to the plurality of control signals.

* * * * *